United States Patent [19]
Frazier

[11] 3,893,371
[45] July 8, 1975

[54] METHOD AND MEANS FOR OPERATING A SPINDLE DRIVE IN A MACHINE TOOL

[75] Inventor: James L. Frazier, Los Alamitos, Calif.

[73] Assignee: Houdaille Industries, Inc., Buffalo, N.Y.

[22] Filed: Mar. 27, 1972

[21] Appl. No.: 238,434

[52] U.S. Cl. .................. 90/11 A; 90/11 D; 408/239
[51] Int. Cl. ........................ B23c 5/26; B23q 21/00
[58] Field of Search ............ 29/26 A, 868; 90/11 A, 90/11 D; 91/37; 408/239 A, 240; 82/28 B; 192/142 R, 148; 318/612, 614, 269

[56] References Cited
UNITED STATES PATENTS

| | | | |
|---|---|---|---|
| 2,537,269 | 1/1951 | Harding | 82/28.2 |
| 3,422,724 | 1/1969 | Zankl et al. | 90/11 |
| 3,458,209 | 7/1969 | Scholz | 408/240 X |
| 3,520,228 | 7/1970 | Wohlfeil | 90/11 |
| 3,568,566 | 3/1971 | Weidig | 90/11 |
| 3,587,359 | 6/1971 | McCash | 29/568 X |
| 3,604,083 | 9/1971 | Antonietto et al. | 29/264 |
| 3,606,817 | 9/1971 | Langley | 91/37 |
| 3,637,058 | 1/1972 | Sato et al. | 192/148 X |
| 3,709,623 | 1/1973 | Stephan et al. | 29/568 X |

*Primary Examiner*—Andrew R. Juhasz
*Attorney, Agent, or Firm*—Hill, Gross, Simpson, Van Santen, Steadman, Chiara & Simpson

[57] ABSTRACT

A machine tool includes a head which supports a vertically movable quill within which there is disposed a rotatable spindle to which various kinds of cutting tools may be attached. The spindle is driven through a mechanism which includes means for locking the spindle in a particular predetermined angular position, such locking means including a detent wheel engageable by a stop member that is operated by a fluid actuator that is partially under the control of a means that senses the angular position of the spindle. Within the quill there is provided a spring-biased annular piston for operating actuating means that are connected to clamping members for clamping onto and for releasing tooling from the spindle when it is in its locked position. When the spindle is to be stopped, power is removed from a spindle drive motor and is reversely applied to obtain dynamic braking, and when the motor is nearly stopped, that condition is sensed to terminate such dynamic braking. For each revolution of the spindle, a pulse is provided and also, a low level of power is reapplied to the drive motor to cause it to creep. The next signal pulse from the spindle is used to remove the low level power and to energize the spindle brake briefly after which the spindle locking means is energized to enable actuation of the annular piston.

6 Claims, 7 Drawing Figures

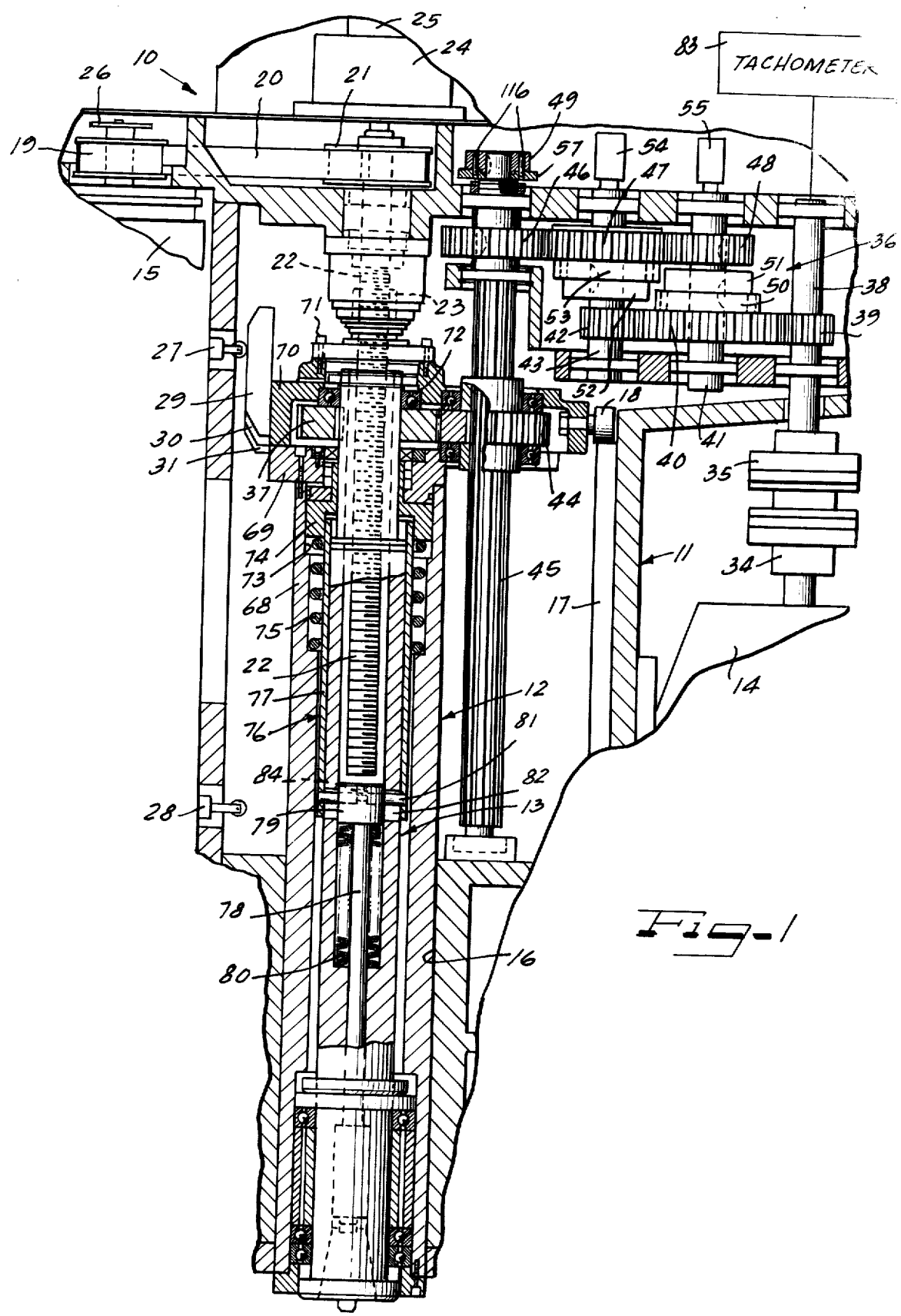

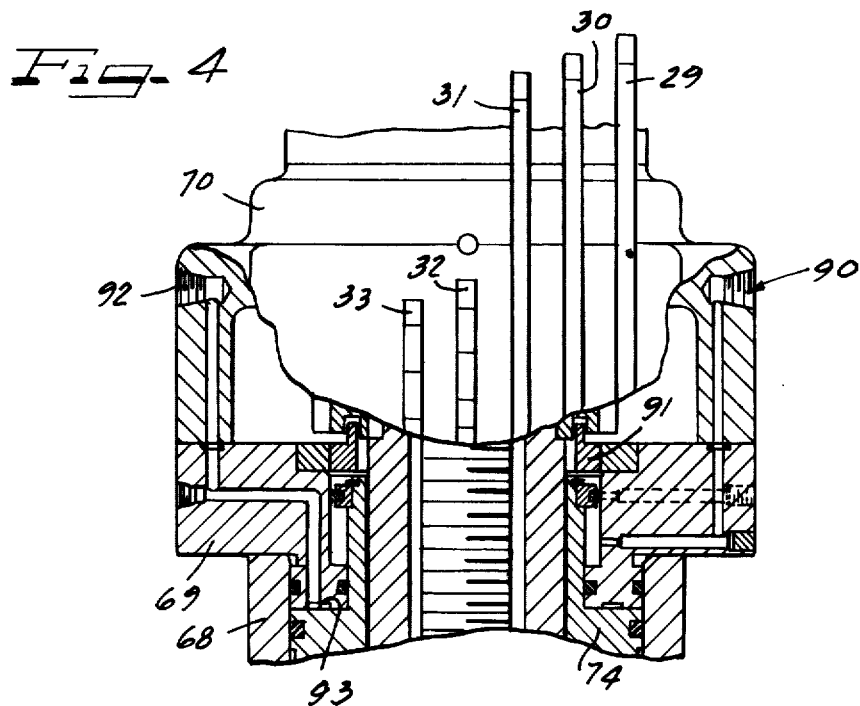
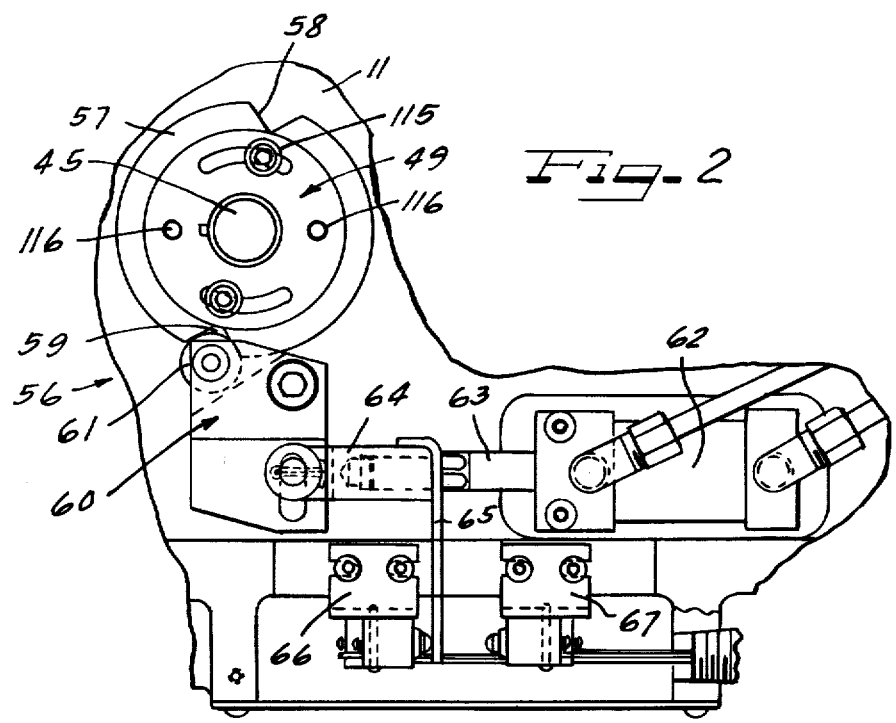

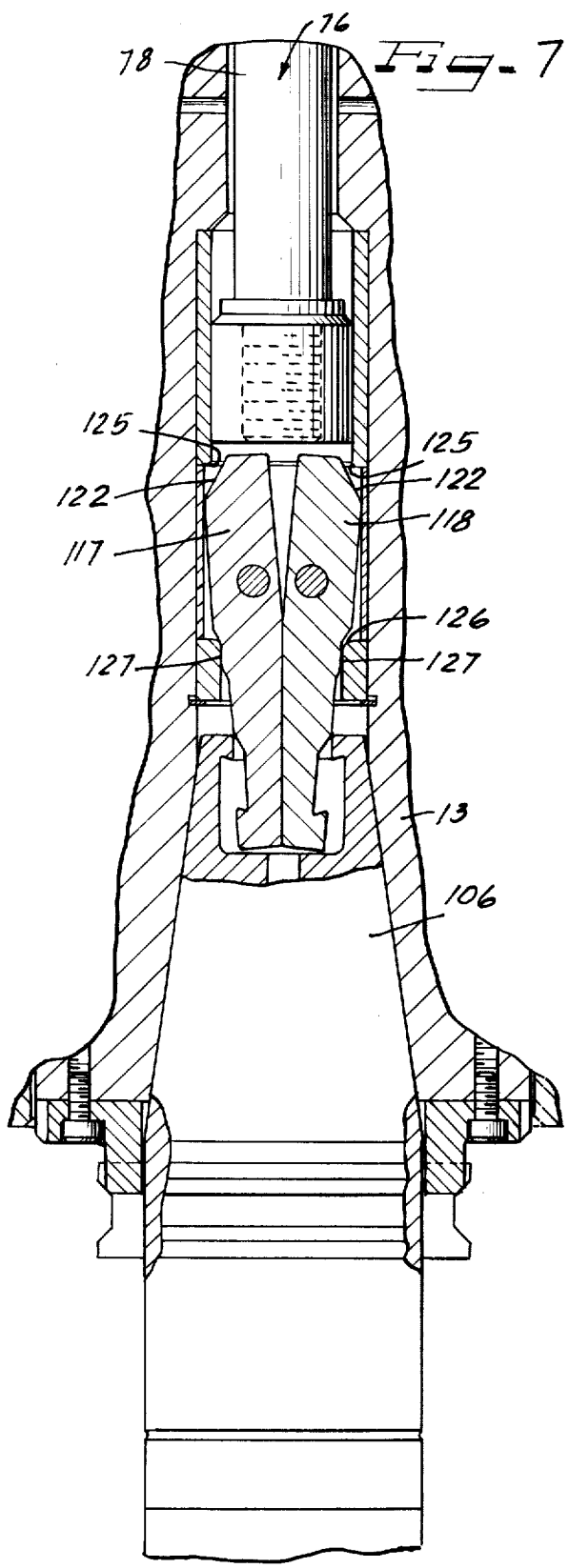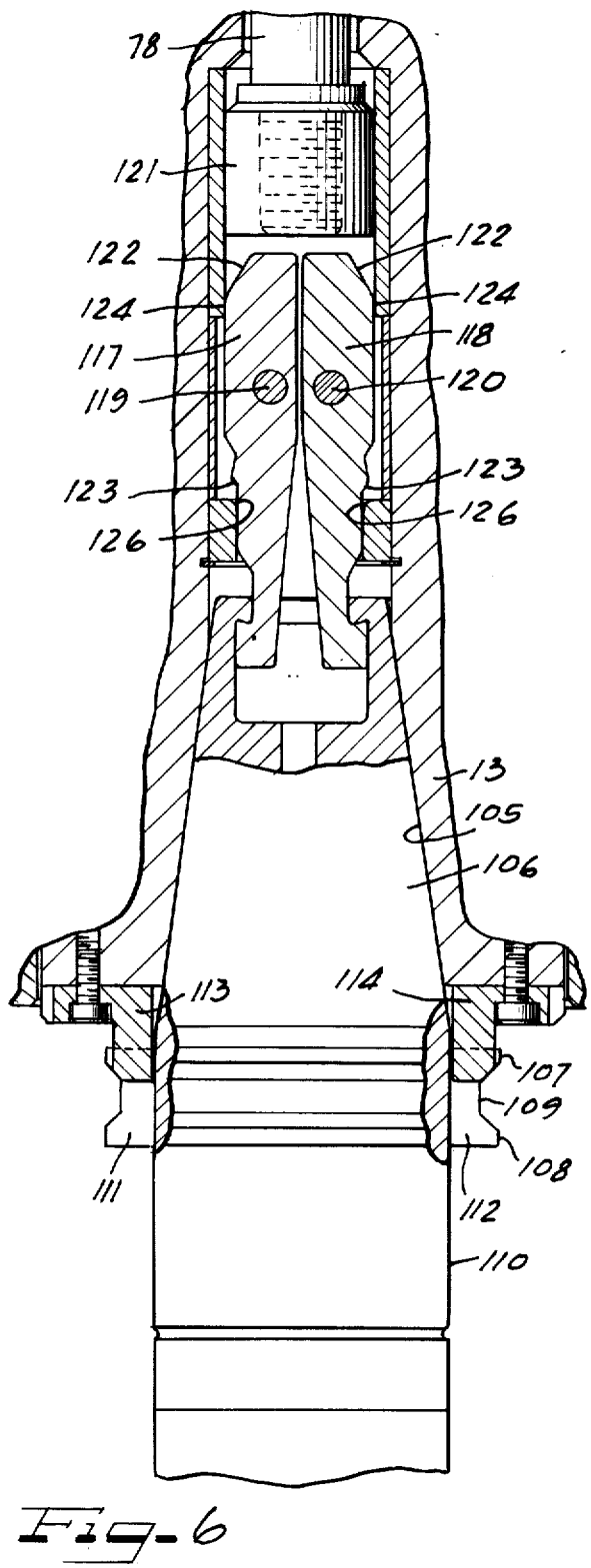

METHOD AND MEANS FOR OPERATING A SPINDLE DRIVE IN A MACHINE TOOL

BACKGROUND OF THE INVENTION

1. Field of the Invention

This invention relates to machine tools, and more specifically to one having a rotary tool-holding spindle that is provided with a method and apparatus for locking the spindle in a predetermined angular position to enable the release of or the loading of a tool held in such spindle.

2. Prior Art

A variety of machine tools having tool changers for changing or transferring rotary cutting tools have been previously manufactured or suggested. Various shortcomings have been noted which are disadvantageous. For instance, complexity has been encountered, if the goal has been met at all, in providing a structure wherein a tool is presented to the spindle in a predetermined angular relationship, namely about the rotational axis, and also considerable complexity has been found in the past in connection with structure for clamping and releasing such tool with respect to the spindle.

SUMMARY OF THE INVENTION

According to this invention, a machine tool is provided with a vertically moving head on which a spindle-supporting quill is reciprocable, the spindle being rotated. The spindle is provided with locking means that include a detent wheel that is rotatable with, but not necessarily at the same rate as, the spindle. Associated with the detent wheel is a stop member in the form of a bell crank having a roller engageable with the detent wheel, the stop member being positively driven toward or retracted from the detent wheel by a fluid actuator. Signaling means operated by the fluid actuator indicate that the spindle has been stopped in a predetermined angular position, and such signaling means enables a piston in the quill to operate actuating means for pivotally carried clamping members that coact with the tooling.

Accordingly, it is an object of the present invention to provide a machine tool wherein the spindle can be automatically stopped and locked in a predetermined angular position.

A further object of the present invention is to provide means for releasing the tooling when the spindle comes to halt in such predetermined position, thereby enabling automatic unloading and reloading of the tooling in a facile manner.

Many other advantages, features and additional objects of the present invention will become manifest to those versed in the art upon making reference to the detailed description of the accompanying drawings in which a preferred structural embodiment incorporating the principles of the present invention is shown by way of illustrative example.

ON THE DRAWINGS:

FIG. 1 is a fragmentary cross sectional view showing the spindle drive structure in a machine tool head provided in accordance with the principles of the present invention;

FIG. 2 is an enlarged top view of a portion of FIG. 1 showing the spindle locking means;

FIG. 4 is a fragmentary cross-sectional view taken from the left side of FIG. 3;

FIG. 6 is an enlarged fragmentary cross sectional view taken along line VI—VI of FIG. 5 with a tool added; and FIG. 7 is a view of the structure of FIG. 6 in the tool releasing position.

Figure 3:
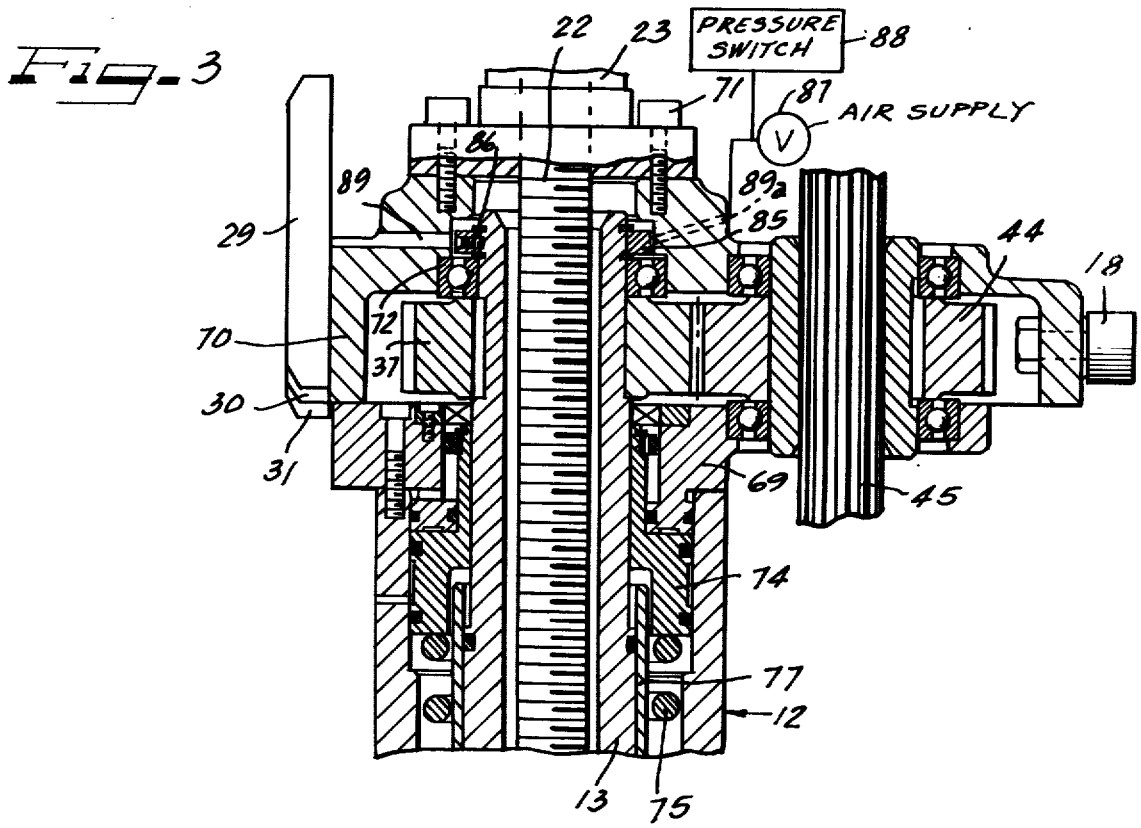
FIG. 3 is an enlarged cross sectional view of the upper portion of the spindle shown in FIG. 1.

AS SHOWN ON THE DRAWINGS:

The principles of the present invention are particularly useful when embodied in a machine tool head such as fragmentarily shown in FIG. 1, generally indicated by the numeral 10. The machine tool head 10 is supported on a frame (not shown) which supports a workpiece-supporting table (not shown) in a known manner. The head 10 comprises a rigid casting or weldment 11 to which various components are secured. Normally, the machine tool is controlled by conventional numerical control circuitry for automatic operation and/or a set of manual controls, certain novel aspects of the present machine as it relates to such otherwise conventional control systems being set forth below.

As shown in FIG. 1, the head 10 supports a quill 12 within which there is disposed a spindle 13. A relatively large spindle motor 14 and a smaller quill motor 15 for reciprocating the quill 12 are secured to the weldment 11 of the head 10. The head 10 has a guide bore 16 which slidably guides the quill 12 for vertical movement parallel to the direction in which the head 10 can move. The head 10 includes internal vertical track means 17 which are straddled by a pair of rollers 18 on the quill 12 to restrain the quill against any angular movement about the rotational axis of the spindle 13. The quill 13 supports the spindle 13 for rotation within the quill, doing so in a manner that renders the quill and the spindle comovable vertically. Thus vertical movement of the quill 12 moves the spindle 13 vertically a like amount.

The quill motor 15 has a pulley 19 about which a belt 20 extends to drive a pulley 21 that is coaxial with the spindle 13. The pulley 21 is corotatably secured to a threaded shaft 22 which has a threaded connection with a nut 23 that is fixably secured to the upper end of the quill 12. The motor 15 is reversible and the threaded shaft 22 is axially fixed, whereby through the nut 23, the entire quill assembly is vertically reciprocated. Reciprocation forces are thus applied concentrically with the tool so that during the feeding of the tool, there is no tendency for the quill to cock or rock within whatever clearance is inherently necessary for its guiding support.

A brake 24 is provided at the upper end of the rotatable screw 23, is of conventional construction and is arranged to act between the screw 23 and the head 10. In addition, there is secured to the rotatable screw 23, a reader 25 of conventional construction for emitting signals to the control system which indicate actual rotation of the screw 23. A pulley 26 is secured to the output shaft of the quill motor 15 for driving a further control sensing element that is in the control circuit of the motor 15.

A cam and switch structure is provided which forms part of the control means for regulating the vertical axial movements of the quill 12. To this end, a series of switches 27 is supported on the head 10 with their actuators extending to the interior thereof at a point near the upper end of the retracted quill 12, and a series of additional switches 28 is disposed therebelow near the upper end of the extended quill. A series of five cams 29–33 is secured to the upper end of the quill 12 as seen in FIGS. 1 and 4.

The spindle motor 14 normally operates continually and has an output shaft that is connected through a pair of couplings 34, 35 to a gear train generally indicated at 36. The spindle 13 has a gear 37 at its upper end within the upper end of the quill 12, and the gear train 36 is drivably connected to the spindle gear 37 to rotate the spindle.

The gear train 36 includes an input shaft 38 to which is secured a gear 39 which meshes with a gear 40 rotatably carried on a shaft 41. The gear 40 meshes with a gear 42 that is corotatably carried on a shaft 43. The gears 39, 40 and 42 constitute a first branch of gearing that is connected to the spindle motor 14, the gears of which thus are all normally rotating continuously. The spindle gear 37 is driven by a gear 44 with which it meshes and which is trapped in the upper part of the quill 12. The gear 44 is internally splined and mates with an elongated spline shaft 45 which corotatably carries a gear 46 which meshes with a gear 47 which is rotatable on the shaft 43, the gear 47 meshing with a gear 48 which is corotatable with the shaft 41. The gear 44 has a number of teeth related to the number of teeth on the gear 37 by certain ratio which depends in part on the number of lugs (described later) on the spindle and on the number of detents or notches in a detent wheel 49 described later. Where there are two teeth on the gear 37 for every tooth on the gear 44 and two lugs on the spindle, each revolution of the detent wheel 49 will coincide with the presence of one of the lugs in a predetermined position. If only one predetermined position or lug is utilized, the gear 37 and 44 have the same number of teeth. The gears 44, 46, 47 and 48 comprise a second branch of gearing in the gear train 36 that is continuously enmeshed serially with the spindle gear 37.

The gear train 36 includes clutch means which selectively connect the first branch of gearing with the second branch of gearing. More specifically, the clutch means comprises two separate clutches. On energizing one of the clutches, a first speed ratio is obtained, and on energizing the second of the clutches, a second speed ratio is obtained. On energizing both of the clutches simultaneously, the gear train locks and hence locks the spindle position against any rotation and thus constitutes a spindle brake. A first of the clutches includes a normally rotating part 50 which is corotatably secured to the gear 40 and which coacts with a driven portion 51 which is keyed to the shaft 41. If neither clutch is energized, then the shafts 38 and 43 rotate, and when the clutch 50, 51 is engaged, the shaft 41 is caused to rotate and as the gear 48 is corotatably secured thereto, the second branch of gearing is operated. This constitutes the low ratio speed range. The second clutch includes a portion 52 which is keyed to the normally rotating shaft 43, and hence this portion of the clutch rotates continuously. The other portion 53 of the second clutch is corotatably secured to the gear 47 of the second branch. Therefore, whenever the second clutch 52, 53 is engaged, power is transmitted from the gear 42, through the shaft 43, the clutch 52, 53 and the gear 47 to the second branch. This mode of operation produces a higher gear ratio. Upon energization of both clutches, the gear train locks up to provide the braking of the spindle 13. The shafts 41 and 43 are provided with suitable fittings 54, 55 through which clutch-engaging energy is transmitted.

A spindle locking means for locking the spindle in a predetermined angular position includes the detent wheel 49 of FIG. 1, and is shown in greater detail in FIG. 1, generally indicated by the numeral 56. The detent wheel 49 is keyed to the spline shaft 45 and has an initially separate track portion 57 with a circular periphery in which there is provided one or more detents 58, 59. A stop member 60 in the form of a bell crank has a roller 61 that rides on the outer periphery of the detent wheel or is retracted therefrom, and such movement is under the control of a fluid actuator 62 that has a rod 63 threaded into a clevis 64 that has a pivotal connection with the stop member 60. When the actuator 62 is energized, the roller 61 is forced against the periphery of the detent wheel, and ordinarily the roller 61 would already be in partial registration with the detent 58 or 59 so that the power from the actuator 62 provides the final precise positioning of the spindle 13. Secured to the piston rod 63 is an arm 65 that cooperates with signaling means in the form of a switch 66 as shown for indicating that the roller is fully seated and for cooperating with a further signaling means or switch 67 to indicate that the roller is fully retracted. Preferably, the signaling means 66 forms part of a circuit for causing the tool to be released as described below.

The quill 12 is an assembly of an elongated tubular body 68 which is slidably guided in the bore 16, and a two-piece head portion 69, 70 which portions 69, 70 are bolted together and bolted to the body 68. The nut 23 is in turn bolted as at 71 to the upper portion 70 of the quill 12. The spindle 13 is supported by a bearing assembly 72 at its upper end, the bearing assembly 72 being contained within the quill portion 70 adjacent to the spindle gear 37. The tubular quill body 68 has a cylinder bore 73 within which there is disposed a piston 74 which is upwardly biased by a spring 75 which encircles the spindle 13, acting between a shoulder within the quill body 68 and the piston 74. Upward movement of the piston 74 is limited by engagement between the piston and the lower end of the quill portion 69. The outside diameter of the piston 74 is stepped, as is the inside diameter of the adjacent portions of the quill 12. Suitable seals and packings are provided as shown where required.

The annular portion 74 is arranged to act upon actuating means generally indicated at 76. The actuating means 76 includes an actuating sleeve 77 which is slidably carried on the spindle 13 extending through the spring 75 in normally slightly axially spaced position from the lower face of the annular piston 74. When the piston 74 is actuated in a downward direction, the annular piston 74 forces the actuating sleeve 77 downwardly. At its lower end, the actuating means 76 includes an actuating rod 78 which has a head 79 slidably guided within the spindle 13 and biased in an upward direction by a set of Belleville springs 80 which act between the spindle and the head 79 of the actuating rod 78. A pin 81 extends through the head 79, through a vertically elongated slot 82 in the spindle 13 and into the lower end of the actuating sleeve 77 so as to form a radial pin connection between the sleeve 77 and rod 78 portions of the actuating means 76. The spring means 80 thus biases the entire actuating means 76 upwardly by an amount that would be limited by the engagement between the pin 80 and the end of the slot 82 but for the presence of tooling as explained below.

As shown in FIG. 1, a tachometer 83 is provided to sense the speed of rotation of the motor 14 and forms part of control means described more fully below. A set screw 84 enters a radial groove in the pin 81 to serve as a retainer.

FIG. 3 shows the upper portion of the quill 12 and spindle 13 in greater detail, particularly as to the seals for the annular piston 74 and its chamber. In addition to the reader 25 which senses spindle rotation, there is provided a spindle sensor 85 which is secured by a set screw 86 to the upper end of the spindle 13. The sensor 85 is in the form of a ring that has a bulge at the point indicated by the reference line to the numeral 85, and on rotation, this bulge rotates past an air inlet 89a to momentarily block it. A valve 87 is connected to an air supply and as shown diagrammatically, air is brought into the cavity in which the spindle sensor 85 is located, so that with the valve 87 open and with the spindle sensor 85 rotating, each time that the bulge on the sensor goes past the inlet 89a, there is a pulsation in air pressure which is sensed by a pressure responsive device such as a pressure switch 88 to provide pulses for controlling the device as explained more fully below. An air vent 89 also provides access to the set screw 86.

FIG. 4 shows the structure of FIG. 3 as viewed from the left side thereof, and in addition, shows lubrication passages 90 for lubricating the piston 74. In addition, a labyrinth seal 91 is shown structurally instead of diagrammatically. More importantly, there is illustrated a fluid port 92 for providing pressurized fluid to an annular groove 93 at the upper face of the piston 74 and thus to the entire upper face of the piston 74 as soon as movement has begun.

Figure 5:
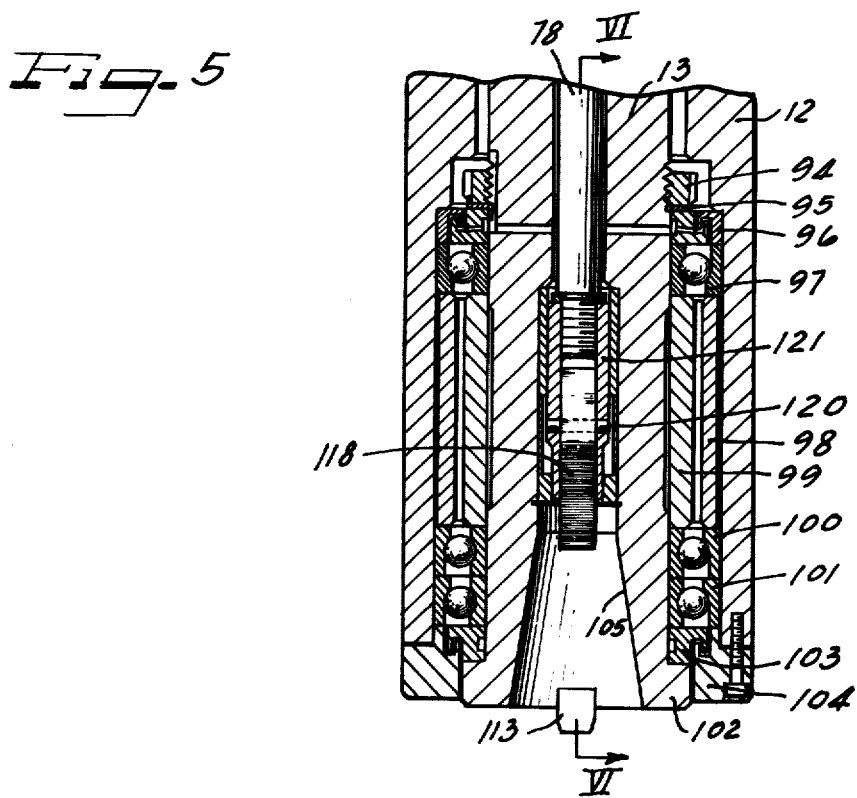
FIG. 5 is an enlarged cross sectional view of the lower portion of the spindle shown in FIG. 1.

FIG. 5 shows primarily the bearing structure by which the lower end of the spindle 13 is supported in the quill 12. The spindle 13 has its largest diameter at the lower end and has a progression of successively smaller diameters along its length. A nut 94 is placed on the spindle 13 prior to assembly thereof along with a locking ring 95 so as to provide an adjustable downwardly facing shoulder engaged by a labyrinth seal 96 which is engaged by a bearing assembly 97 of the thrust bearing type. The bearing 97 transfers downwardly directed forces from the spindle 13 to the quill 12, and thus the bearing 97 supports all the structure carried by the spindle 13 under conditions where no cutting is taking place. The outer race of the bearing 97 engages a tubular member 98 and the inner race of the bearing 97 engages a smaller tubular member 99, such tubular members 98, 99 respectively engaging the outer and inner races of a thrust bearing 100 whose races correspondingly engage the races of a further thrust bearing 101. A flange 102 on the spindle 13 acts through a labyrinth seal 103 against the inner race of the bearing 101 and the inner race of the bearing 100 to transfer a force during cutting to the outer races at the lower end of the quill 12 through the outer tubular spacer 98 and the outer race of the bearing 97 and the labyrinth seal 96 to an internal shoulder on the quill 12. The components 96-101 and 103 are held in position by a clamp ring 104. Any axial play in the spindle is taken out by the adjusting nut 94.

As best seen in FIG. 6, the spindle 13 has a tapered socket 105 for receiving tooling such as a tool or tool adapter 106 having a corresponding taper. The tool 106 has a pair of spaced flanges 107, 108 with a groove 109 therebetween and a straight portion 110 therebelow to enable the same to be utilized in a particular type of tool changer. The flanges 107, 108 are slotted as at 111 and 112 at diametrically opposite positions, and the spindle 13 is provided with a pair of downwardly projecting lugs which project into the slots 111, 112 respectively to provide positive angular driving of the tool 106. It is preferable to use two lugs 113, 114 so as to avoid an unbalance, but a single such lug may be utilized where balance has been taken into account. When an automatic tool changer presents a tool 106 of this type to the spindle 13, it is therefore not only essential for the tool changer to present the tool with the slots 111, 112 properly oriented, but it is necessary that the spindle 13 have stopped in the proper angular position so that the lugs 113, 114 will register with the slots for being received therein.

Assuming that the predetermined stopping position for the spindle, and more specifically for the lugs 113, 114 places those spindles at a 3 o'clock and 9 o'clock position, it is therefore necessary that the detents 58, 59 of FIG. 2 are so located that such lug placement will occur precisely. The ring portion 57 is therefore adjustable so that when the machine tool is being assembled, proper adjustment is made at the factory utilizing angular setting means 115. When the desired position has been found, the setting means 115 are not only tightened, but are in effect eliminated by drilling a pair of holes and inserting a pair of pins 116, 116, shown in both FIG. 2 and FIG. 1.

As shown in FIG. 6, at least one and preferably two clamping members 117, 118 are provided to hold the tool 106 in the position illustrated. Each clamping member 117, 118 is pivotally supported as at 119, 120 for rocking between the clamped position illustrated in FIG. 6 and the released position illustrated in FIG. 7. As better seen in FIG. 5, the lower end of the actuating rod 78 has threaded thereto an elongated split block 121 which supports the opposite ends of the pivot pins 119, 120 and which is slidably guided within the spindle 13. Each of the clamping members 117, 118 has a cam surface 122 and a cam surface 123. Immediately below the cam surface 122, there is a straight portion 124. When the clamping members 117, 118 are in the released position as shown in FIG. 7 by virtue of the actuating means 76 being in the lowered position, the upper ends of the clamping members are received in a recess or groove. When fluid pressure is relieved from the piston 74 the actuating means 76 raises under the influence of the springs 80 and draws the clamping members 117, 118 upwardly to cause the cam surfaces 122 to engage an abutment 125 in the spindle whereby the clamping members' upper ends are rocked together from the position shown in FIG. 7 to the position shown in FIG. 6, and further upward movement causes the straight portions 124 to engage a locking surface just above the abutments 125.

When the actuating means 76 moves the clamping members 117, 118 in a downward direction from the position illustrated in FIG. 6 to the position illustrated in FIG. 7 to release a tool, the cam surfaces 123 engage a lower abutment 126 just after the straight portions 124 have cleared the abutments 125 so as to cause the lower ends of the clamping members 117, 118 to move together. As the downward movement continues, a straight portion 127 on each of the clamping members 117, 118 comes into engagement with a locking surface just below the lower abutments 126 to positively hold the clamping members in the released position. When the clamping members 117, 118 are disposed as shown in FIG. 7, the tool 106 is free to drop out of the spindle 13.

The lower ends of the clamping members 117, 118 are adapted to cooperate with appropriate structure on the tool 106 as shown.

During normal cutting, the tool 106 is held as shown in FIG. 6, the spindle 13 is driven rotatably, and the quill 12 is driven downwardly for a distance programmed into the machine tool, and on completion is retracted. To then change to a different tool, the following method is utilized in operating the disclosed structure.

In response to a command, such as from the numerical control, power is removed from the dc-motor 14 which drives the spindle 13, and power is immediately reconnected with opposite polarity so as to obtain dynamic braking. At this time also, preferably the valve 87 on FIG. 3 is energized to provide air for the spindle senser 85. (The air supply controlled by the valve 87 could be continuously on with a control switch utilized, but the arrangement shown economizes in the use of air.) Dynamic braking is continued until the tachometer 83, which could be a centrifugal switch, senses the speed of the motor 14 as being under 30 rpm, for example 20 rpm, and then the signal taken from the tachometer 83 that denotes such speed is utilized to terminate the dynamic braking, and also power is immediately reapplied in the driving direction to the dc-spindle drive motor 14, but at a low level, a level of potential sufficient to obtain a creeping type of rotation of the motor 14. In the meantime, the spindle sensor 85 has been creating pulses of air pressure sensed by the pressure switch 88 or equivalent device, and those pulses have gone unused. Immediately, when the low level of power is reapplied to the spindle motor 14, the pressure switch 88 is placed in the circuit so that the next pulse from the switch 88 is utilized. This pulse is used to shut off all power to the spindle motor 14 and to energize both clutches in the gear train 36 so as to brake the spindle 13 for a predetermined timed period. The duration of such braking is short but is sufficient to make certain that the spindle 13 has come to a complete stop. At this point in the operation, the roller 61 is in approximate registration with one of the detents 58, 59 and when the braking is terminated, the actuator 62 is energized to drive the roller 61 of the stop member 60 into the detent 58 or 59 with sufficient force to rotate the splined shaft 45 and hence the spindle 13 along with the upper branch of the gear train 36, so that the spindle locking means 56 is in the position illustrated in FIG. 2.

When the spindle locking means 56 has driven the spindle 13 to the predetermined angular position, the signaling means 66 gives a signal which causes fluid power to be delivered to the port 92 for driving the piston 74 downwardly, thereby moving the clamping members 117, 118 from the position shown in FIG. 6 to the position shown in FIG. 7 to enable tool change. When a new tool has been inserted as shown in FIG. 7 and locked in place as shown in FIG. 6, then the actuator 62 of the spindle locking means is driven in the opposite direction to unlock the spindle 13 for rotation, such unlocking being signalled by the signaling means 67 to indicate that the machine tool may now go forward with its next cutting operation.

Although various minor modifications might be suggested by those versed in the art, it should be understood that I wish to embody within the scope of the patent warranted hereon, all such embodiments as reasonably and properly come within the scope of my contribution to the art.

I claim:

1. A machine tool comprising in combination:
   a. a head;
   b. a quill non-rotatably slidably mounted on said head for axial movement with respect to said head during machining;
   c. a spindle rotatably carried by and within said non-rotatable quill for joint axial movement with said quill with respect to said head, and adapted to drivably carry a tool;
   d. a spindle motor drivably connected to said spindle to rotate it;
   e. a quill motor drivably connected to said quill to reciprocate said quill and said quill-supported spindle;
   f. a detent wheel connected at all times to be rotatably driven at a speed having a fixed ratio to the spindle speed, and having at least one peripheral detent;
   g. a movable stop member disposed to be driven into and retracted from said spindle detent for locking said spindle in a predetermined angular position after said spindle motor has been fully deenergized;
   h. means defining a pressurized air inlet port directed toward said spindle;
   i. a ring corotatably carried on said spindle and having a bulge rotatable past said inlet port to restrict air flow therefrom for producing a change in static pressure; and
   j. a pressure switch responsive to said pressure change and connected to control locking movement of said stop member.

2. A machine tool according to claim 1 including means by which the angular position of said detent wheel may be initially set for selecting said predetermined angular position of said spindle.

3. A machine tool according to claim 1 in which said detent wheel has a plurality of distinct equally spaced detents, and in which there are such plurality of said predetermined angular positions that said stop member aligns with one of said detents each time one of said positions is reached.

4. A machine tool according to claim 3 in which said stop member is arranged to lock said spindle at random in either of two predetermined angular positions 180° apart.

5. A method of stopping a machine tool spindle at a predetermined angular position, the machine tool having a dc-spindle drive motor, a spindle brake and spindle locking means, comprising:

a. removing power from the dc-spindle drive motor and reapplying power thereto with reversed polarity to obtain dynamic braking;
b. obtaining a signal pulse when the motor is nearly stopped and using it to terminate dynamic braking;
c. providing a signal pulse per revolution of the spindle;
d. reapplying a low level of power to the drive motor to obtain creep rotation thereof;
e. using the next signal pulse from the spindle to effect removing the low level power and to energize the spindle brake for a predetermined period of time; and
f. thereafter energizing the spindle locking means.

6. A method according to claim 5 in which the signal pulse from the motor is provided when the motor speed is under 30 rpm.

* * * * *